Feb. 7, 1961 G. W. PIERCE 2,970,381
ADJUSTABLE LEVEL POSITION INDICATOR FOR
OBJECTS SUBJECT TO MOVEMENT
Filed Feb. 27, 1959
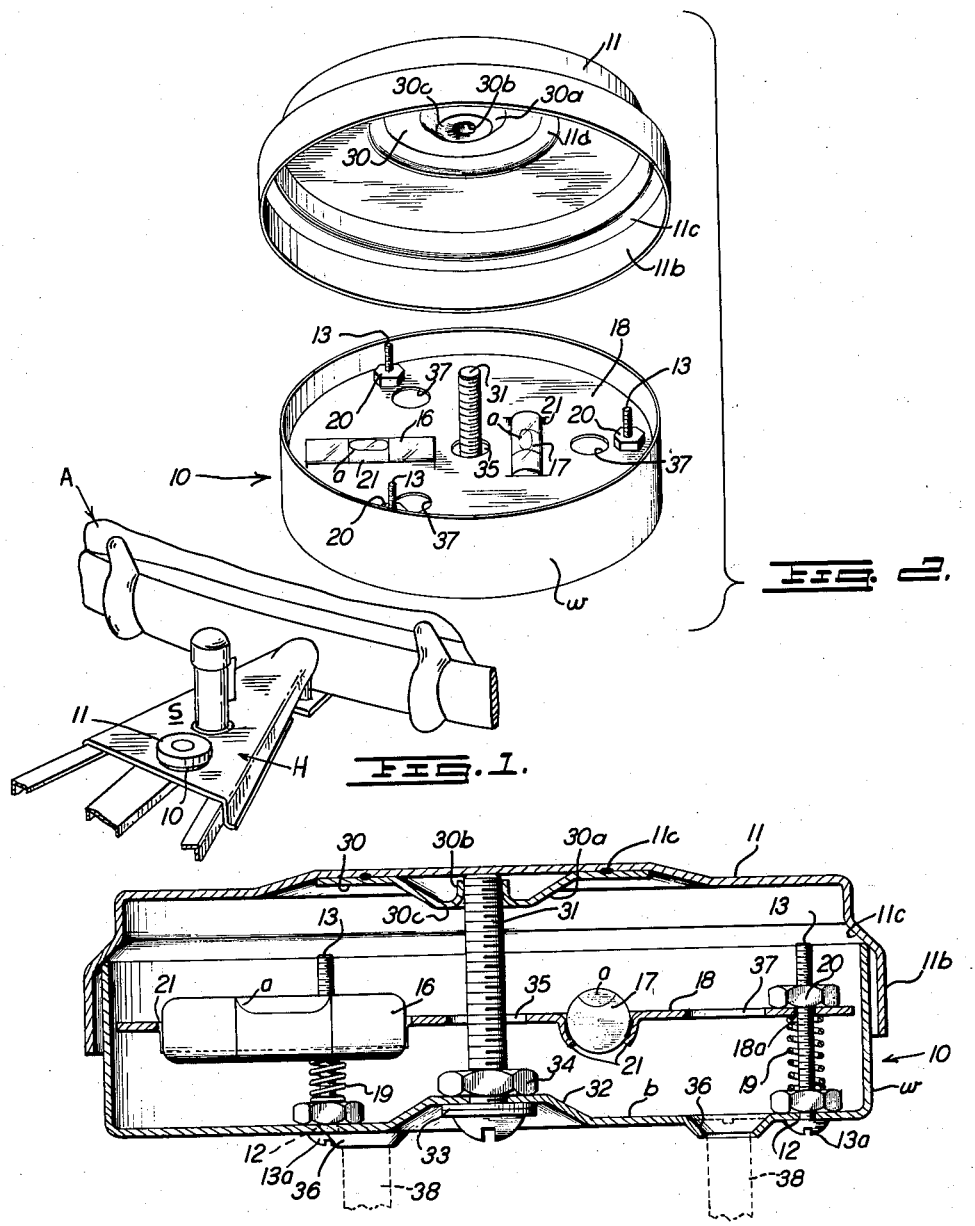
INVENTOR.
GEORGE W. PIERCE
ATTORNEY

United States Patent Office 2,970,381
Patented Feb. 7, 1961

2,970,381

ADJUSTABLE LEVEL POSITION INDICATOR FOR OBJECTS SUBJECT TO MOVEMENT

George W. Pierce, 64 Hawthorne St., Eugene, Oreg.

Filed Feb. 27, 1959, Ser. No. 796,173

3 Claims. (Cl. 33—207)

The present invention relates to an improved level-device for general application and is particularly useful as an adjustable level indicator for mobile trailers, and the like, and it is a continuation-in-part of my copending application Serial No. 715,828, filed February 17, 1958.

It has long been the practice to employ a, so-called, spirit-level in the construction of structures and of apparatus of most all types and to apply or attach them to pipes, tables or other objects or thingss to permit the ascertainment of, or to act as an indicator by which it may be determined, the position of said objects or things relative to the horizontal or to the vertical; and some of these level-devices have been equipped with means for adjusting said devices.

Nevertheless, there still remains a need for a very inexpensive level-device of simple construction and smallness of size that may be applied to all types of movable objects or those subjected to motion and where it is desirable, or important, to determine the position of such objects; and it is a desideratum that such level-device indicate the level in two directions and be subject to adjustment within the device itself, while attached to its movable object, without disturbing in any way the object to which it is attached.

The object, therefore, of this invention is to provide such a simple and inexpensive level-device of novel construction and general utility that it may be employed with and readily secured to a mobile trailer, pinball-machine, pool or billiard tables, the bodies of wagons or automobiles or their chassis, beam or girder structures, beams of scales or scale platforms or other platforms, bridge-decks or walkways, and with an infinity of other objects or things too numerous to mention, and be protected against damagess in the ordinary use of the object to which it is attached and, at the same time, fulfill the need or want above enumerated.

The above object is attained by the organization and combination of elements hereinafter more fully described in the following specification and illustrated in the accompanying drawings; and the novel features of the device will be pointed out in the appended claims. It will be understood, however, that changes may be made in the form, size, proportions and in other minor details of construction without departing from or sacrificing any of the advantagess of the invention so long as said changes fall within the scope of the appended claims.

The invention is illustrated, by way of example, in the accompanying drawings, in which—

Figure 1 is a fragmental perspective view of motor-trailer hitch attached to the rear-end of an automobile and equipped with the level-device of the present invention;

Figure 2 is a disassembled perspective view of the device according to this invention in the form which is now being commercialized; and Figure 3 is a vertical sectional view in its assembled condition.

Referring to the drawings, in which like characters of reference refer to like parts throughout the several views, the level device of this invention comprises a casing or housing 10 of rigid material, of box-like formation and provided with a covering lid 11. It has been found that for most purposes the box-like housing may be about 3 to 3½ inches in diameter and of a depth sufficient to contain the level means mounted therein, this depth being ordinarily about one inch.

The bottom wall $b$ of the box-like housing 10 is formed with three apertures 12 (see Fig. 3), two of these apertures being spaced from each other and disposed a distance from one side wall $w$ of said housing so that they may be said to outline an equilateral triangle or an isosceles triangle. A threaded and headed bolt 13 extends upwardly through each of these openings 12, respectively, to form supporting posts within the casing 10. A nut 14 is threaded on each of the bolts or posts 13 to tightly clamp the edge-portions of the apertures of openings 12 against the head 13$a$ of the bolts.

The level means comprises two spirit levels 16 and 17, each consisting of a cylindrical-like capsule of transparent material, such as glass or resin (commonly referred to as plastics) containing a liquid almost completely filling the capsule in order to define an air-bubble $a$ adapted to shift in the capsule as the same is tilted while in a generally horizontal position and as is commonly known.

These two spirit levels 16 and 17 are arranged in substantially the same plane and at right angles to each other within the box-housing 10 in a T-shape formation so as to indicate variations in their position in two directions. The capsules forming the body of the spirit level are supported and maintained in this position by an adjustable carrier 18 preferably, circular or disc-like in shape and having enlarged openings 18$a$ therein adapted to register with and through which the posts 13 will extend, there being helical compression springs 19 interposed between the carrier and the nuts 14 and surrounding each of the posts 13. The ends of said springs bear respectively on said carrier 18 and said nuts 14 and the carrier is held in position against said spring by adjustable nuts 20 threaded on the posts 13, thus permitting adjustment of the levels 16 and 17 from within the housing.

The box-like housing 10 may be covered with a lid 11 of any suitable type to keep out dirt from the spirit level means housed within it and to protect it from damage.

The circular lid 11 has a depending circular flange 11$a$ which telescopes over the circular wall $w$ of the housing 10$m$ and which is offset inwardly to form a circumferential shoulder surface 11$c$, diverging downwardly relative to the lid, which surface is brought into binding and sealing contact with the rim edge of the circular wall $w$ of the housing, when the lid is rotated into closed position, as shown in Figure 3.

The top wall of the lid 11 may be reinforced by offsetting outwardly a circular central portion, as shown at 11$d$, which forms a depression on the underside of the top of the lid. A washer-like disc 30 is disposed in said depression and is spot-welded to the lid and has its central portion 30$a$ depressed or offset downwardly relative to the lid, the central axial portion of said offset portion 30$a$ being deflected in a reverse direction to said offset portion and is punched and threaded, thus forming an internally threaded boss or sleeve 30$b$ for the reception of a threaded stud 31.

It will be noted that the reversely deflected portion 30$b$ forms a rounded guiding surface 30$c$, converging toward the threaded sleeve 30$b$ and surrounding the same, to provide an enlarged funneling guide to assist in locating and directing the threaded end of the stud 31 into said sleeve 30$b$, when the flange 11$b$ is telescoped over the rim of the housing 10. The stud 31 is affixed to the bottom wall *b* of the housing at its axial center so that its upper end will align with and come into registering engagement with the threaded sleeve 30*b*, when the lid is rotated about the housing. The stud 31 is, preferably, a headed machine-screw, extending upwardly through an opening in an upwardly offset portion 32 in the bottom wall *b* of the housing 10, with the head of the screw within said depression 32 and engaging the underside of the bottom wall and held tightly fixed in position by a lock-washer 33 and a nut 34 engaging the inner face of the bottom wall *b*. An enlarged central opening 35 is provided in the carrier 18 to permit the stud to extend through the carrier.

The spirit level vials 16 and 17 are located in flanged openings 21 and cemented to said flanged portions.

It is proposed to provide feet on the bottom wall *b* of the housing for mounting the bottom wall slightly spaced from the object to which the level indicating device is attached; and, this is accomplished by providing downwardly deflected circular portions on the bottom wall in the form of countersunk openings 36 of sufficient depth to extend below any stud or screw heads that may project below the bottom wall of the housing—thus forming supporting feet. These countersunk foot portions 36 are at least three in number and positioned, preferably, adjacent each of the posts 13. The spirit level vial carrier 18 is formed with an opening 37 overlying each of the foot portions 36, whereby a screw or bolt member 38 may be passed through each of the openings 37 to extend through an underlying foot portion with its head lying within the countersunk portion of the foot 36, the openings 37 also providing means by which a screw driver or like implement may be extended for manipulating the fastening screws 38, when the lid is removed.

The form of the invention, shown in the drawings, is most facile to manufacture and provides a weatherproof level device yet one which may be easily and quickly inspected by removal of the lid and, as a result, is now on the market.

The level-devices, above described, may be readily applied to an object or thing, subject to movement, by selecting a suitable surface or area on the object to which they may be attached by the screws 38 and this surface or area should be flat to accommodate the bottom wall *b* of the housing 10 or at least the feet 36. For instance, and as shown in Figure 1, the device illustrated is secured to the surface S on the shield or bar of a trailer-hitch H coupled to the rear-end of an automobile A because it becomes necessary, when each camp is made, to put the trailer in a near level position so as to be able to cook, eat, sleep, etc., with a degree of comfort and convenience. With this leveler device so attached and properly set, the operator needs only to remove the lid 11 and check the level-device. Should transverse leveling be indicated as being required, the operator may move the trailer to a place more level or only lower one wheel; and should longitudinal or forward leveling be indicated, this can be accomplished by simply cranking the hitch jack up or down as required, and, while doing both or either, observing the level-device. In this manner, leveling is accomplished quickly and accurately. The surface S may be a similar surface of a pin-ball machine, table, scale-beam, platform, bridge deck and the like to which the level-device is attached and adjusted to level position; and, thereafter, it may be determined at any time whether the normal or operating position has changed either longitudinally or transversely. In other words, the use of the device is to give an operator, engineer or other person a constant check on any object which is subject to movement.

The method of installing the level-device of this invention to a flat surface, as just mentioned, is quite simple by means of screws or other fasteners 38 passed through opening 37 in the level carrier-plate 18 to project through the countersunk opening in the feet 36; and, after so doing, the levels 16—17 are set to level position by proper adjustment of one or more of the nuts 20 by the fingers of the hand. While levels, so adjusted, may indicate a level position, the actual position of the object, to which the device is attached, may or may not be level; and, if the object is not level, its position may be the best or normal position the object will assume under ordinary or normal conditions or under its then present conditions. Thereafter, should there be a change in position of the object from that when the levels 16—17 were last adjusted, an inspection of said levels will so indicate and whether the change in position was, for instance, longitudinally or transversely of the object, or in both directions. At this time, the change in position of the object may be remedied.

One of the important features of the present device, in addition to others pointed out above, is that the levels 16—17 may be adjusted internally of the housing 10, which gives clear access for this purpose, without dismantling the device, other than removing its cover or lid 11, and without disturbing, moving or leveling the object itself in any way, yet permitting the adjustment of the level means in two directions to give proper indications at substantially right-angles to each other.

Having thus described the invention and the manner in which it is to be performed and used, it is believed that the numerous of its attendant advantages will be manifest and understood; and that while one form of the device herein illustrated and described is the form in which it is at present devised, such form of the device is merely for the purpose of illustrating the invention and may be varied within the scope of the appended claim or claims.

That which is claimed, as new and to be secured by Letters Patent, is:

1. As a new article of manufacture, a removably attachable position-indicator device for objects subject to movement comprising a flat container having a bottom wall and a side wall having at least a circular upper rim marginal portion and a circular lid having a flanged edge adapted to removably fit over and around the rim of the circular portion of said side wall, said lid having a boss axially positioned on its underside and formed with a central threaded opening surrounded by a converging guiding surface; a level support disposed transversely of and within said container and including two spirit-level vials positioned thereon at right angles to each other and mounted on the container for adjustment to bring said spirit-levels to a level position; and a threaded stud within the container and fast to and rising from its bottom wall through said level support to align and interengage with said threaded boss on said lid, when the flange of said lid surrounds the rim of the container, whereby the stud is guided to said threaded opening in said boss and, by relative rotation of said container and lid in one direction, said lid is brought into tight sealing engagement with said container and, by relative rotation in the other direction, said lid may be removed for inspection and/or adjustment of said level support.

2. As a new article of manufacture, a removably attachable position-indicator device for objects subject to movement comprising a flat container having a bottom and a side wall having a circular rim portion and a circular flanged lid adapted to removably fit over and around the rim of said side wall, a boss axially positioned and fixed on the underside of said lid and having a central threaded opening therein surrounded by an outer surface converging toward said opening, a threaded stud centrally positioned within said container and fast to and rising from its bottom wall to align with and to a height to interengage with said threaded opening in said boss, a level carrier-plate disposed within and transversely of said container and having an enlarged central opening therein through which said stud extends freely, a pair of spirit-level vials mounted on said carrier-plate angularly with respect to each other and lying on opposite sides of said central opening in said carrier-plate, adjustment means in said container and associated with said carrier-plate to effect planar adjustment of the latter and of said vials, whereby, when said lid is placed over the container with its flange surrounding the rim of the container, said stud is guided to the threaded opening in said boss to rotatively engage therewith and, by relative rotation of said container and lid in one direction, the rim of the container is brought into tight sealing engagement with said lid and, by rotation in the other direction, the lid may be removed for inspection of and/or for adjustment of said level vials.

3. A new article as set forth in claim 2 further characterized by the bottom wall of said container having downwardly directed countersunk openings therein for the reception of fastener members therethrough and with the countersunk portions forming feet to space the container from the supporting surface of the object to which it is attached, and said carrier-plate having openings therein overlying and aligned with said countersunk openings and through which fastener members and a tool may be passed, when attaching and removing the container to and from said object.

References Cited in the file of this patent

UNITED STATES PATENTS

| | | |
|---|---|---|
| 219,357 | Howe | Sept. 9, 1879 |
| 686,975 | Kelly | Nov. 19, 1901 |
| 2,287,344 | Easton et al. | June 23, 1942 |
| 2,460,721 | Thompson | Feb. 1, 1949 |
| 2,647,652 | Sanford | Aug. 4, 1953 |
| 2,660,804 | Mundy | Dec. 1, 1953 |
| 2,689,412 | Young | Sept. 21, 1954 |